(No Model.)
W. S. REEDER.
SAW SWAGE.
No. 247,687. Patented Sept. 27, 1881.
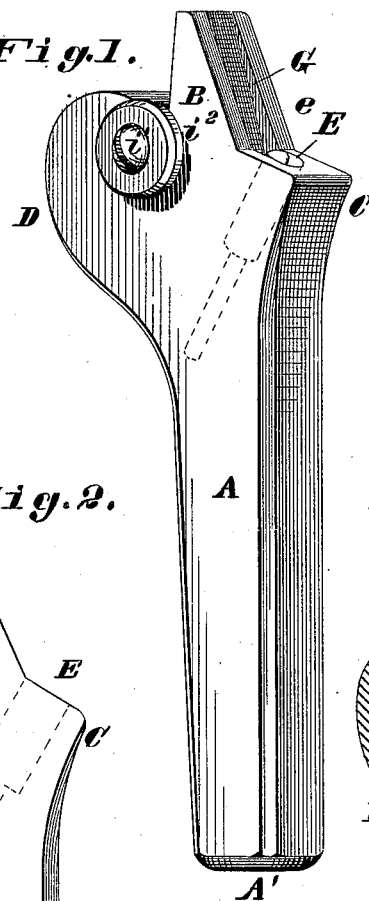
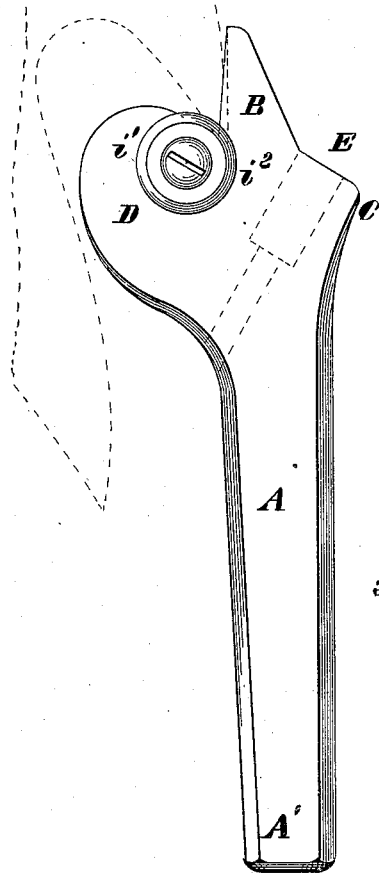
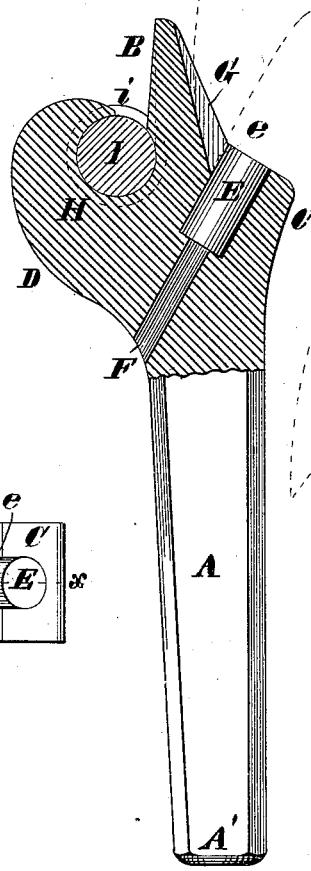
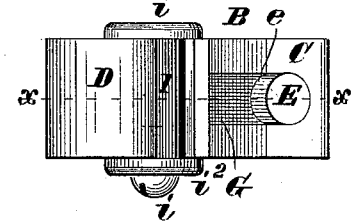
Attest:
Charles Pickles
J. E. Knight
Inventor:
William S. Reeder
By Knight Bros.
Attys.

UNITED STATES PATENT OFFICE.

WILLIAM S. REEDER, OF ST. LOUIS, MISSOURI.

SAW-SWAGE.

SPECIFICATION forming part of Letters Patent No. 247,687, dated September 27, 1881.

Application filed June 10, 1881. (No model.)

*To all whom it may concern:*

Be it known that I, WILLIAM S. REEDER, of the city of St. Louis, in the State of Missouri, have invented a certain new and useful Improvement in Saw-Tooth Swages, of which the following is a full, clear, and exact description, reference being had to the accompanying drawings, forming part of this specification.

This is a tool for upsetting the points of saw-teeth, spreading the metal laterally, and bringing it to an edge. The tool has two recesses, each formed between a central projection and a removable pin of hard steel, said pins having capacity for adjustment to bring fresh bearing-surfaces to the points of the teeth.

In the drawings, Figure 1 is a perspective view. Fig. 2 is a side view. Fig. 3 is part in side view and part in section at $x\,x$, Fig. 4. Fig. 4 is an end view of the head.

A is the shank. The head has a central projection or point, B, with side projections or shoulders, C and D. The shoulder C is bored obliquely to receive a pin, E, that may be cylindrical in form or vary more or less from this shape.

At F is shown a drift-hole for the insertion of a drift beneath the end of the pin E, to drive it out of its socket or bore.

G is a groove or channel in one side of the projection B, to receive the top or back of the tooth when the parts are in position for swaging. (See Fig. 3, where the saw-tooth is shown in broken lines.)

It will be seen by reference to Figs. 1, 3, and 4 that the groove G exposes or leaves bare a part of the side of pin E near the top (shown at *e*) for contact with the point of the tooth. When the tool is in the position shown—upon the tooth—the blow of a hammer upon the end A' of the tool spreads the point laterally, leaving the edge concave in form, owing to the round shape of the pin E.

H is a transverse bore in the shoulder D, which receives a hard steel pin, I, that is held in position by a head, *i*, and a screw and washer, *i'* and *i²*.

The side *b* of the projection B may be in a plane tangential to the bore H, as shown in dotted lines in Figs. 2 and 3, or it may deviate from said plane, as shown in full lines in said figures. I do not confine myself to any particular angle. It may vary according to the style of saw and the kind of wood or other material to be operated upon.

It will be understood that the pin I will rest against the point of the tooth, and on a blow being given to the end A' of the tool the point will be brought to an edge and spread out laterally. The position of the saw is seen in broken lines in Fig. 2.

The pin I may be so fitted in the bore that it will turn therein when the swage is struck, so as to present fresh surfaces to the point of the tooth, thus keeping the surface of the pin in perfect condition, the wear being distributed around the whole circumference.

The pin E may be loosened in its socket or taken therefrom and turned to bring a fresh part in contact with the point of the tooth. New pins can easily be substituted for worn ones.

In using the swage, if the part having the swage-pin E is first applied to the tooth, it will force the metal laterally and concave the point and cutting-edge of the tooth, sharpening the corners. Then the other part (pin I) will spread the tooth and form a broad chisel-edge with sharp corners.

I do not use nor provide the collars at the ends of the cylindrical pin or die for the purpose of securing a uniform width in the points of the teeth while being swaged and sharpened, but merely for the purpose of holding the pin in its place, while the collars should be sufficiently free to admit of the cylindrical die rotating to bring any portion of its periphery in contact with the tooth of the saw.

I claim as my invention—

1. A saw-swage formed with a projection, B, and groove G, and having a cylindrical pin, E, set at an inclination to the back-rest, as set forth.

2. A saw-swage having the projection or tongue B and the pins E and I, substantially as set forth.

WILLIAM S. REEDER.

Witnesses:
SAML. KNIGHT,
GEO. H. KNIGHT.